US011455384B2

(12) United States Patent
Ko et al.

(10) Patent No.: US 11,455,384 B2
(45) Date of Patent: Sep. 27, 2022

(54) USER AUTHENTICATION METHOD AND APPARATUS WITH ADAPTIVELY UPDATED ENROLLMENT DATABASE (DB)

(71) Applicant: Samsung Electronics Co., Ltd., Suwon-si (KR)

(72) Inventors: Minsu Ko, Suwon-si (KR); Seungju Han, Seoul (KR); Jaejoon Han, Seoul (KR); Deoksang Kim, Hwaseong-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 17/083,618

(22) Filed: Oct. 29, 2020

(65) Prior Publication Data

US 2021/0042404 A1 Feb. 11, 2021

Related U.S. Application Data

(63) Continuation of application No. 15/967,898, filed on May 1, 2018, now Pat. No. 10,860,700.

(30) Foreign Application Priority Data

Jun. 20, 2017 (KR) .................. 10-2017-0077900

(51) Int. Cl.
*G06F 21/32* (2013.01)
*G06F 16/583* (2019.01)

(52) U.S. Cl.
CPC ............ *G06F 21/32* (2013.01); *G06F 16/583* (2019.01); *G06F 2221/2117* (2013.01)

(58) Field of Classification Search
CPC .................. G06F 21/32; G06F 16/583; G06F 2221/2117; G06F 21/45
See application file for complete search history.

(56) References Cited

U.S. PATENT DOCUMENTS 9,141,184 B2 * 9/2015 Uchikoshi ............ G06V 10/993
9,165,404 B2 10/2015 Han et al.
(Continued)

FOREIGN PATENT DOCUMENTS

JP 4883987 B2 2/2012
JP 5920894 B2 5/2016
(Continued)

OTHER PUBLICATIONS

Kekre et al., "Ageing Adaptation for Multimodal Biometrics using Adaptive Feature Set Update Algorithm". Mar. 2009, IEEE International Advance Computing Conference, pp. 535-540. (Year: 2009).

(Continued)

*Primary Examiner* — Matthew Smithers
(74) *Attorney, Agent, or Firm* — NSIP Law

(57) ABSTRACT

A method and apparatus with an adaptively updated enrollment database (DB) are provided. A method with an adaptively updated enrollment database (DB) includes extracting an input feature vector from an input image, determining whether the input feature vector is included in a changeable enrollment range, with the changeable enrollment range being determined based on a threshold distance from each of plural enrolled feature vectors in the enrollment DB, and with the enrolled feature vectors corresponding to enrolled images, determining whether to enroll the input feature vector in the enrollment DB in response to the input feature vector being determined as being included in the changeable enrollment range, and in response to a result of the determining of whether to enroll the input feature vector being to enroll the input feature vector, selectively enrolling the input feature vector in the enrollment DB.

3 Claims, 11 Drawing Sheets

(56) References Cited

U.S. PATENT DOCUMENTS

| | | | |
|---|---|---|---|
| 9,530,052 B1* | 12/2016 | Pillai | G06V 40/197 |
| 10,860,700 B2* | 12/2020 | Ko | G06F 16/583 |
| 2002/0152390 A1 | 10/2002 | Furuyama et al. | |
| 2003/0198368 A1 | 10/2003 | Kee | |
| 2008/0273766 A1 | 11/2008 | Kim et al. | |
| 2008/0304707 A1 | 12/2008 | Oi et al. | |
| 2010/0315201 A1* | 12/2010 | Hirata | G06F 21/32 |
| | | | 340/5.82 |
| 2013/0250181 A1 | 9/2013 | Zhang et al. | |
| 2013/0263238 A1 | 10/2013 | Bidare | |
| 2013/0318351 A1* | 11/2013 | Hirano | H04L 9/3231 |
| | | | 713/168 |
| 2014/0099029 A1* | 4/2014 | Sawides | G06V 10/44 |
| | | | 382/197 |
| 2014/0254891 A1 | 9/2014 | Lee et al. | |
| 2015/0092996 A1* | 4/2015 | Tian | G06V 40/171 |
| | | | 382/118 |
| 2015/0139492 A1* | 5/2015 | Murakami | G06V 10/443 |
| | | | 382/103 |
| 2015/0381616 A1* | 12/2015 | Jo | G06F 21/6218 |
| | | | 713/186 |
| 2017/0063852 A1* | 3/2017 | Azar | G06V 40/70 |
| 2017/0116401 A1 | 4/2017 | Kim et al. | |
| 2017/0132408 A1 | 5/2017 | Kim et al. | |
| 2018/0197539 A1 | 7/2018 | Kang et al. | |
| 2018/0285629 A1* | 10/2018 | Son | G06Q 20/40145 |
| 2019/0222847 A1* | 7/2019 | Wongpaisarnsin | H04N 19/149 |

FOREIGN PATENT DOCUMENTS

| | | |
|---|---|---|
| KR | 10-0898766 B1 | 5/2009 |
| KR | 10-2016-0046560 A | 4/2016 |
| KR | 10-2016-0066380 A | 6/2016 |
| KR | 10-2016-0072705 A | 6/2016 |
| KR | 10-2016-0098581 A | 8/2016 |
| KR | 10-2017-0003348 A | 1/2017 |
| KR | 10-2017-0055393 A | 5/2017 |

OTHER PUBLICATIONS

Korean Notice of Preliminary Rejections dated Aug. 25, 2021 in corresponding Korean Patent Application No. 10-2017-0077900 (3 pages in English and 4 pages in Korean).

Korean Office Action dated Apr. 26, 2022, in counterpart Korean Patent Application No. 10-2017-0077900 (4 pages in English and 5 pages in Korean).

* cited by examiner

USER AUTHENTICATION METHOD AND APPARATUS WITH ADAPTIVELY UPDATED ENROLLMENT DATABASE (DB)

CROSS-REFERENCE TO RELATED APPLICATIONS

This application is a continuation of U.S. patent application Ser. No. 15/967,898 filed on May 1, 2018, which claims the benefit under 35 USC § 119(a) of Korean Patent Application No. 10-2017-0077900, filed on Jun. 20, 2017, in the Korean Intellectual Property Office, the entire disclosures of which are all incorporated herein by reference for all purposes.

BACKGROUND

1. Field

The following description relates to a user authentication method and apparatus with adaptively updated enrollment database (DB).

2. Description of Related Art

In various wearable devices or various mobile devices such as smartphones, biometric information of a user is used for automated security authentication. Since face recognition has a large number of elements that change over time, for example, depending on makeup style, hair style, facial hair, or a weight of a user, and due to such authentication being performed in the automated manner, there are decreases in accuracy and performance when performing such automated authentication comparing a previously enrolled image to a current input face image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented method with an adaptively updated enrollment database (DB) includes extracting an input feature vector from an input image, determining whether the input feature vector is included in a changeable enrollment range, with the changeable enrollment range being determined based on a threshold distance from each of plural enrolled feature vectors in the enrollment DB, and with the enrolled feature vectors corresponding to enrolled images, determining whether to enroll the input feature vector in the enrollment DB in response to the input feature vector being determined as being included in the changeable enrollment range, and in response to a result of the determining of whether to enroll the input feature vector being to enroll the input feature vector, selectively enrolling the input feature vector in the enrollment DB.

The method further may include performing user authentication with respect to the input feature vector, including determining whether the user authentication is successful based on whether an authorization distances, or respective authorization distances, between the input feature vector and one or more of the enrolled feature vectors are determined to be less than respective authentication thresholds corresponding to the one or more enrolled feature vectors.

The method may further include selectively, based on a result of the user authentication, performing the determining of whether to enroll the input feature vector in the enrollment DB.

The changeable enrollment range may be determined based on any one or any combination of two or more of a similarity between the enrolled feature vectors, a minimum threshold distance from each of the enrolled feature vectors, and a maximum threshold distance from each of the enrolled feature vectors.

The determining of whether the input feature vector is included in the changeable enrollment range may include any one or any combination of determining whether the input feature vector corresponds to a non-user outlier based on the enrolled feature vectors, and determining whether a feature range of the enrollment DB would be increased, with inclusion of the input feature vector in the enrollment DB, based on the input feature vector and the changeable enrollment range.

The determining of whether the input feature vector corresponds to the non-user outlier may include calculating a minimum distance between the input feature vector and each of the enrolled feature vectors, and determining whether the input feature vector is the non-user outlier based on the calculated minimum distance.

The determining of whether the input feature vector is the non-user outlier may include determining, based on whether the calculated minimum distance is determined to be greater than a predetermined update threshold, whether the input feature vector is the non-user outlier.

The determining of whether the feature range would be increased may include determining, based on whether the input feature vector satisfies a first condition that the input feature vector is determined to be within a predetermined threshold distance from an enrolled feature vector determined to be farthest from the input feature vector, and a second condition that the input feature vector is determined to be included in the changeable enrollment range, whether the feature range is increased.

The determining of whether to enroll the input feature vector may include determining to add the input feature vector to the enrollment DB in response to the input feature vector satisfying the first condition.

The determining of whether to enroll the input feature vector may further include determining to replace one of the enrolled feature vectors with the input feature vector in response to the input feature vector satisfying the first condition and the second condition.

The determining of whether to enroll the input feature vector may include determining to enroll the input feature vector as an initially enrolled feature vector, based on a result of the determining of whether the input feature vector corresponds to the non-user outlier, and a result of a comparing of a number of the enrolled feature vectors to a predetermined number of initially enrolled feature vectors.

The determining of whether to enroll the input feature vector may include determining to enroll the input feature vector as the initially enrolled feature vector in response to the input feature vector being determined not to be the non-user outlier and the number of the enrolled feature vectors being determined to be less than the number of the initially enrolled feature vectors.

The determining of whether to enroll the input feature vector may include, based on a result of a comparing of the number of the enrolled feature vectors to a predetermined maximum enrollment number of the enrollment DB, and based on whether a distance between the input feature vector and each of the enrolled feature vectors is determined to be less than a predetermined addition threshold or a predetermined replacement threshold, any one or any combination of determining to add the input feature vector to the enrollment DB, and determining to replace one of the enrolled feature vectors with the input feature vector.

The determining to add the input feature vector to the enrollment DB may include determining to add the input feature vector to the enrollment DB in response to the input feature vector not being the non-user outlier, and in response to the number of the enrolled feature vectors being determined to be greater than the number of the initially enrolled feature vectors and being determined to be less than the maximum enrollment number.

The determining to replace the one of the enrolled feature vectors with the input feature vector may include determining to replace the one of the enrolled feature vectors with the input feature vector in response to the input feature vector not being the non-user outlier, and in response to the number of the enrolled feature vectors being determined to be greater than the number of the initially enrolled feature vectors and being determined to be greater than or equal to the maximum enrollment number.

The determining of whether to enroll the input feature vector may include, based on a result of a comparing of the number of the enrolled feature vectors to a predetermined maximum enrollment number of the enrollment DB, and based on whether a distance between the input feature vector and each of the enrolled feature vectors is determined to be less than a predetermined addition threshold or a predetermined replacement threshold, any one or any combination of determining to add the input feature vector to the enrollment DB, and determining to replace one of the enrolled feature vectors with the input feature vector.

The predetermined addition threshold and the predetermined replacement threshold may be respectively pre-determined based on consideration of a predetermined false acceptance or rejection potential for authentication using the enrollment DB.

The predetermined addition threshold may represent a greater distance than the predetermined replacement threshold, or the predetermined addition threshold may represent a lesser similarity threshold than the predetermined replacement threshold.

The determining of whether to enroll the input feature vector may include adding the input feature vector to the enrollment DB in response to the input feature vector not being the non-user outlier and the number of the enrolled feature vectors being determined to be less than the predetermined maximum enrollment number.

The determining of whether to enroll the input feature vector may include replacing the one of the enrolled feature vectors with the input feature vector in response to the input feature vector not being the non-user outlier and the number of the enrolled feature vectors being determined to be greater than or equal to the predetermined maximum enrollment number.

The threshold distance may be heuristically determined.

The method may further include performing user authentication with respect to another input feature vector, including determining whether the user authentication is successful based on whether a distance between the other input feature vector and one or more of the enrolled feature vectors is determined to be less than an authentication threshold, or respective authentication thresholds, corresponding to the one or more enrolled feature vectors, where the enrollment DB includes the enrolled input feature vector.

In one general aspect, provided is a non-transitory computer-readable storage medium storing instructions that, when executed by a processor, cause the processor to perform any one, any combination, or all operations described herein.

In one general aspect, an apparatus with an adaptively updated enrollment database (DB) includes a memory configured to store the enrollment DB including enrolled feature vectors corresponding to enrolled images, and a processor configured to extract an input feature vector from an input image, to determine whether the input feature vector is included in a changeable enrollment range that is determined based on a threshold distance from each of the enrolled feature vectors, to determine whether to enroll the input feature vector in the enrollment DB in response to the input feature vector being determined as being included in the changeable enrollment range, and, in response to a result of the determining of whether to enroll the input feature vector being to enroll the input feature vector, to selectively enroll the input feature vector in the enrollment DB.

The apparatus may further include an image sensor, wherein the processor may be configured, to perform the extraction of the input feature vector, to extract a corresponding multi-dimensional feature vector from any one or any combination of two or more of a captured, by the image sensor, face image, fingerprint image, and eye or iris image.

The apparatus may further include an image sensor, wherein the processor may be configured, to perform the extraction of the input feature vector, to extract a corresponding multi-dimensional feature vector from a blood vessel image captured by the image sensor.

The processor may be further configured to determine whether a feature range of the enrollment DB would be increased by inclusion of the input feature vector in the enrollment DB, with the determination of whether the feature range of the enrollment DB would be increased being based on the input feature vector and the changeable enrollment range.

The processor may be further configured to determine whether the feature range would be increased based on whether the input feature vector satisfies a first condition that the input feature vector is within a predetermined threshold distance from an enrolled feature vector farthest from the input feature vector, and a second condition that the input feature vector is included in the changeable enrollment range.

To perform the determining of whether to enroll the input feature vector, the processor may be configured to, based on a result of a comparing of the number of the enrolled feature vectors to a predetermined maximum enrollment number of the enrollment DB, and based on whether a distance between the input feature vector and each of the enrolled feature vectors is determined to be less than a predetermined addition threshold or a predetermined replacement threshold, perform any one or any combination of determining to add the input feature vector to the enrollment DB, and determining to replace one of the enrolled feature vectors with the input feature vector.

For the determining of whether to enroll the input feature vector, the processor may be configured to add the input feature vector to the enrollment DB in response to the input feature vector being determined to not be a non-user outlier and the number of the enrolled feature vectors being determined to be less than the predetermined maximum enrollment number.

For the determining of whether to enroll the input feature vector, the processor may be configured to replace the one of the enrolled feature vectors with the input feature vector in response to the input feature vector being determined to not be a non-user outlier and the number of the enrolled feature vectors being determined to be greater than or equal to the predetermined maximum enrollment number.

The processor may be further configured to perform user authentication with respect to the input feature vector, including determining whether the user authentication is successful based on whether an authorization distances, or respective authorization distances, between the input feature vector and one or more of the enrolled feature vectors is determined to be less than respective authentication thresholds corresponding to the one or more enrolled feature vectors.

The processor may be configured to selectively, based on a result of the user authentication, perform the determining of whether to enroll the input feature vector in the enrollment DB.

In one general aspect, a processor implemented method with an adaptively updated enrollment database (DB) includes extracting an input feature vector from an input image, determining whether the input feature vector is included in a mutually restricted changeable enrollment range, dependent on plural enrolled feature vectors in the enrollment DB, and indicative of whether a feature range of the enrollment DB would be increased with inclusion of the input feature vector in the enrollment DB, selectively enrolling the input feature vector in the enrollment DB based on a determined similarity between the input feature vector and at least one of the plural enrolled feature vectors being determined to be greater than a predetermined threshold, including adding the input feature vector to the enrollment DB when the similarity is determined to be greater than the predetermined threshold.

The predetermined threshold may be pre-determined based on consideration of a predetermined false acceptance or rejection potential for authentication using the enrollment DB.

In the selective enrolling the input feature vector in the enrollment DB based on the determined similarity between the input feature vector and the at least one of the plural enrolled feature vectors being determined to be greater than the predetermined threshold, the selective enrolling of the input feature vector in the enrollment DB may be based on a determination of whether the similarity between the input feature vector and the at least one of the plural enrolled feature vectors is greater than a predetermined addition threshold or greater than a predetermined replacement threshold, and includes adding the input feature vector to the enrollment DB when the similarity is determined to be greater than the predetermined addition threshold and replaces the at least one of the plural enrolled feature vectors with the input feature vector when the similarity is determined to be greater than the predetermined replacement threshold.

The predetermined addition threshold and the predetermined replacement threshold may be respectively pre-determined based on the consideration of the predetermined false acceptance or rejection potential for authentication using the enrollment DB, and the predetermined addition threshold may be determined to represent a lesser similarity threshold than the predetermined replacement threshold.

The method may further include performing user authentication with respect to the input feature vector, including determining whether the user authentication is successful based on whether an authorization similarity between the input feature vector and one or more of the enrolled feature vectors is determined to be greater than an authentication threshold, or respective authentication thresholds, corresponding to the one or more enrolled feature vectors, and selectively, based on a result of the user authentication, performing the determining of whether the input feature vector is included in the changeable enrollment range and the selective enrolling of the input feature vector in the enrollment DB.

The predetermined threshold, and the authentication threshold or the respective authentication thresholds, may be respectively predetermined based on a predetermined false acceptance or rejection potential for authentication using the enrollment DB, such that the authentication threshold or the respective authentication thresholds may represent respective lesser similarity thresholds than the predetermined threshold.

Other features and aspects will be apparent from the following detailed description, the drawings, and the claims.

Figure 1:
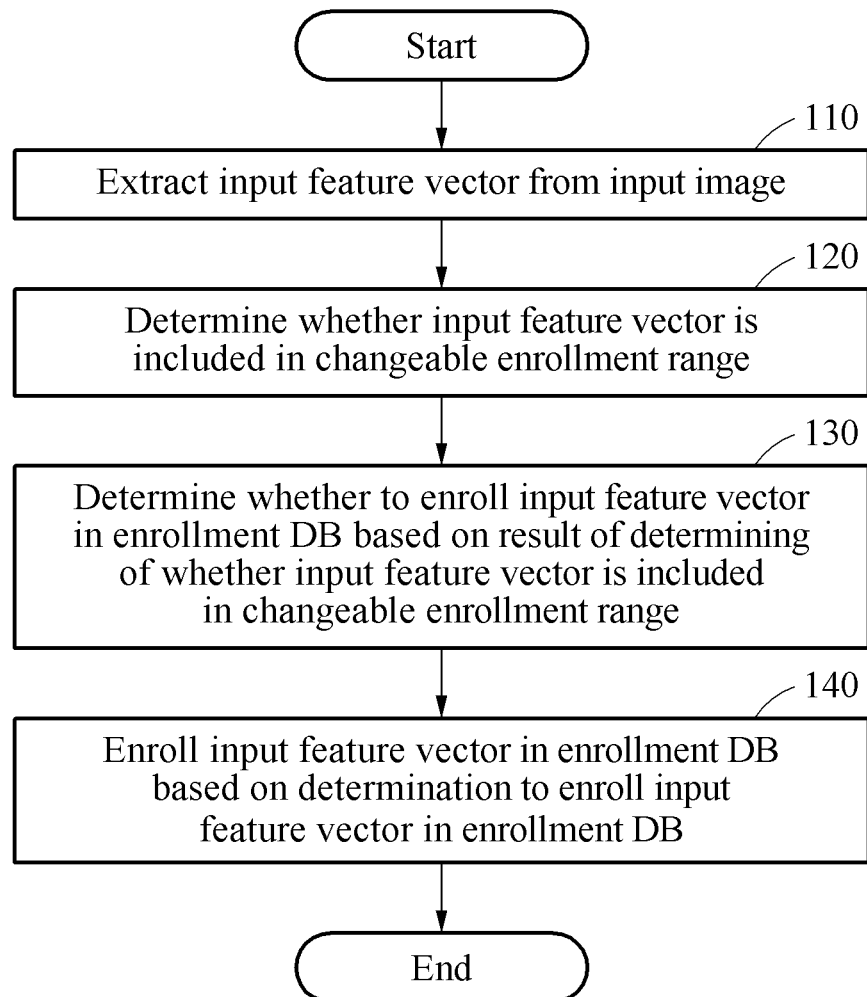
FIG. 1 is a flowchart illustrating an example of a method of adaptively updating an enrollment database (DB).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after such thorough understanding of the disclosure of this application, with the exception of operations necessarily occurring in a certain order. Also, descriptions of functions and constructions that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are exemplary to merely describe the examples, and the scope of the examples is not limited to the descriptions provided in the present specification. Various changes and modifications can be made thereto after an understanding of the present disclosure.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component.

It will be understood that when a component is referred to as being "connected to" another component, the component may be directly connected or coupled to the other component or intervening components may be present. However, when a component is described as being "directly" connected or coupled to another component, there are no intervening components present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art after an understanding of the present disclosure. Terms defined in dictionaries generally used should be construed to have meanings matching with contextual meanings in the related art and the present disclosure and are not to be construed as an ideal or excessively formal meaning unless otherwise defined herein.

In the following description, examples include verifying or recognizing a face of a user or of various people. An operation of verifying or recognizing a face may respectively include an operation of authenticating or identifying the user, for example by a computing apparatus that performs such verification and/or face recognition for one of more services or functions of computing apparatus(es), as non-limiting examples. For example, any of the computing apparatus 600 of FIG. 6, computing apparatus 700 of FIG. 7, or computing apparatuses of FIGS. 8A-8E may correspond to such a computing apparatus, perform such authentication and/or identification described herein, as well as perform such adaptive updating of enrollment databases (DBs) in or of the computing apparatus(es) for use in the authentication or identification operations as further discussed herein. In an additional example, an operation of authenticating a user includes an operation of determining whether the user is enrolled in advance. In this example, a result obtained by authenticating the user may be output as a "true" indicating result or "false" indicating result. In another example, such operations of identifying a user may further include an operation of determining that the user corresponds to any one user among a plurality of pre-enrolled people. In this example, a result obtained by identifying the user is output as an identification (ID) of any one pre-enrolled person. When the user does not correspond to any one person among the plurality of pre-enrolled people, a signal indicating that the user is not identified may be output. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

As noted, examples may be implemented as various types of products, where the computing apparatus may be any of personal computers (PCs), laptop computers, tablet computers, smartphones, televisions (TV), smart home appliances, intelligent vehicles, kiosks or wearable devices, as non-limiting examples. For example, such computing apparatuses may authenticate a user in a smartphone, a mobile device or a smart home system with such adaptively updated enrollment DBs and corresponding adaptive updating methods described herein. As another example, such computing apparatuses may be configured to operate as, or interact with, a payment service through such user authentication. Also, as still further examples, the computing apparatus may configured as an intelligent vehicle system that performs such authenticating of a user to automatically start a vehicle, among other operations, for example.

FIG. 1 illustrates an example of a method of adaptively updating an enrollment database (DB). For example, an apparatus (hereinafter, referred to as a "computing apparatus") may perform authentication or identification of an input image with an adaptive updating of the enrollment DB. In an alternative example, the computing apparatus may be separate or remote from the corresponding user authentication performing apparatus or is configured as another user authentication apparatus. For example, the computing apparatus may be one of a server or first authentication apparatus and may perform adaptive updating of the enrollment DB based on received or provided input feature vectors, while another authentication apparatus may be provided or receive the updated enrollment DB by the computing apparatus and perform such authentication or identification using the updated enrollment DB. The computing apparatus is implemented by, for example, a hardware module, e.g., by a computing apparatus described herein, or by a combination of hardware and software by such a computing apparatus described herein at least partially implementing such operations through corresponding executed instructions. In addition, the computing apparatus should also be understood to refer to the corresponding computing apparatus or device that performs such authentication or identification using the adaptively updated enrolment DB and performs such corresponding adaptive enrollment of the enrollment DB. In addition, in the following description, the enrollment DB is also referred to as an "enrollment template."

Figure 8A:
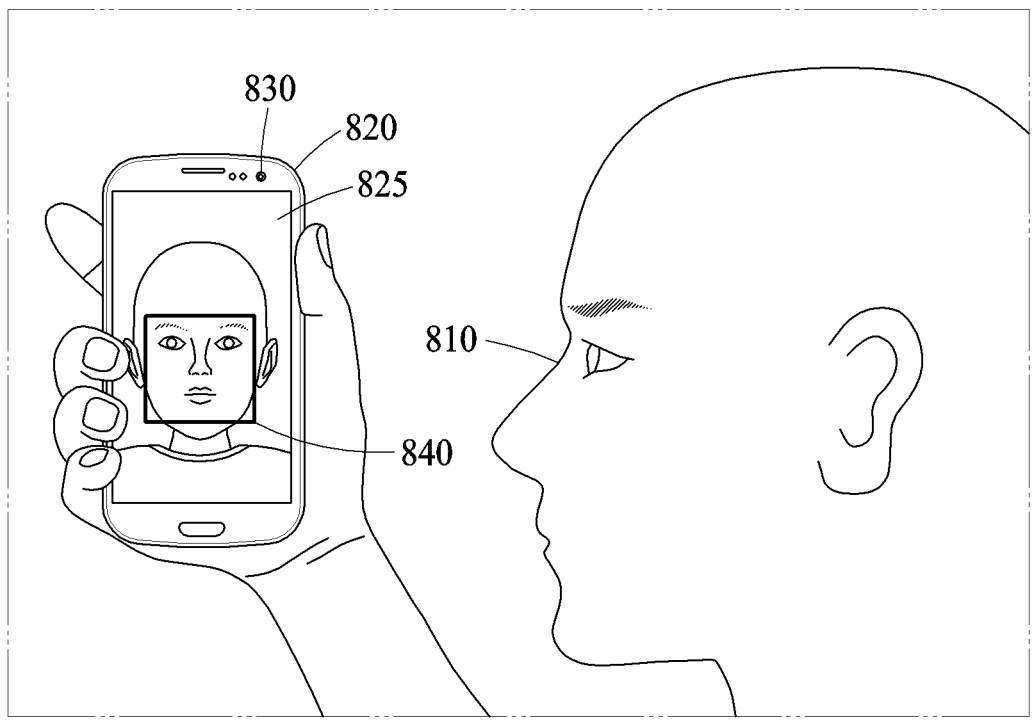
FIGS. 8A-8E illustrates examples of authenticating or identifying operations with computing apparatuses that implement adaptive updated enrollment DBs.
Figure 8B:
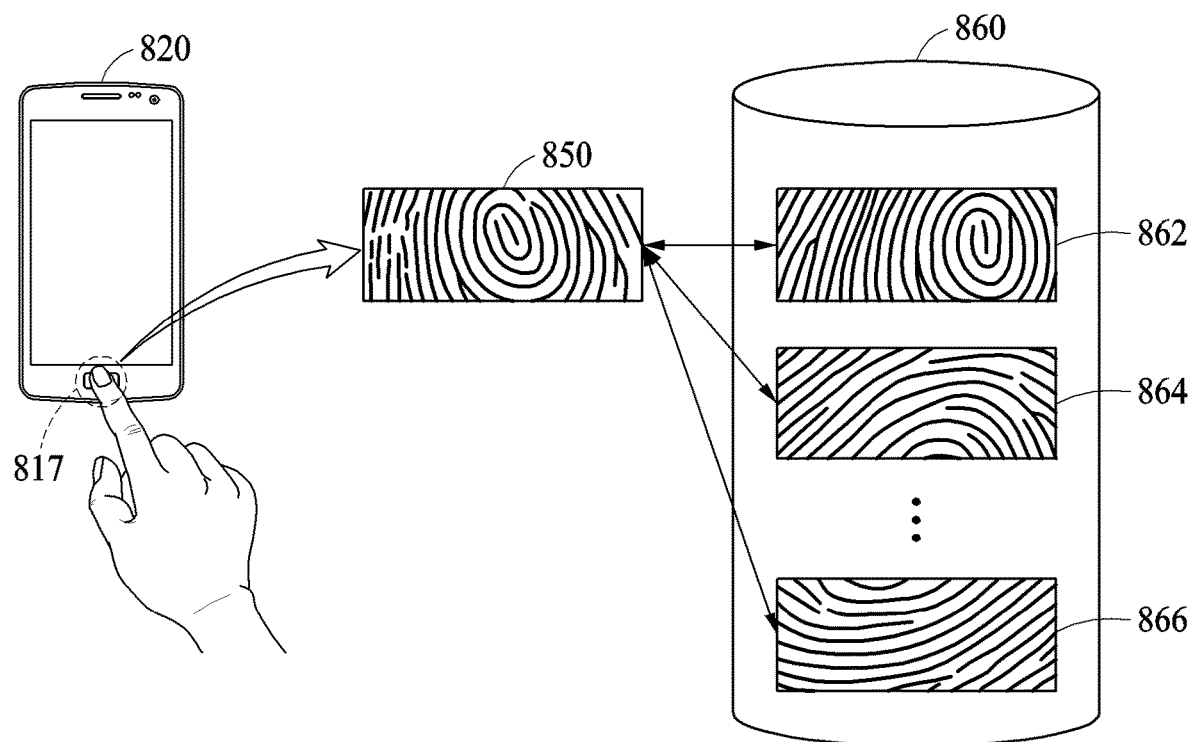
Figure 8C:
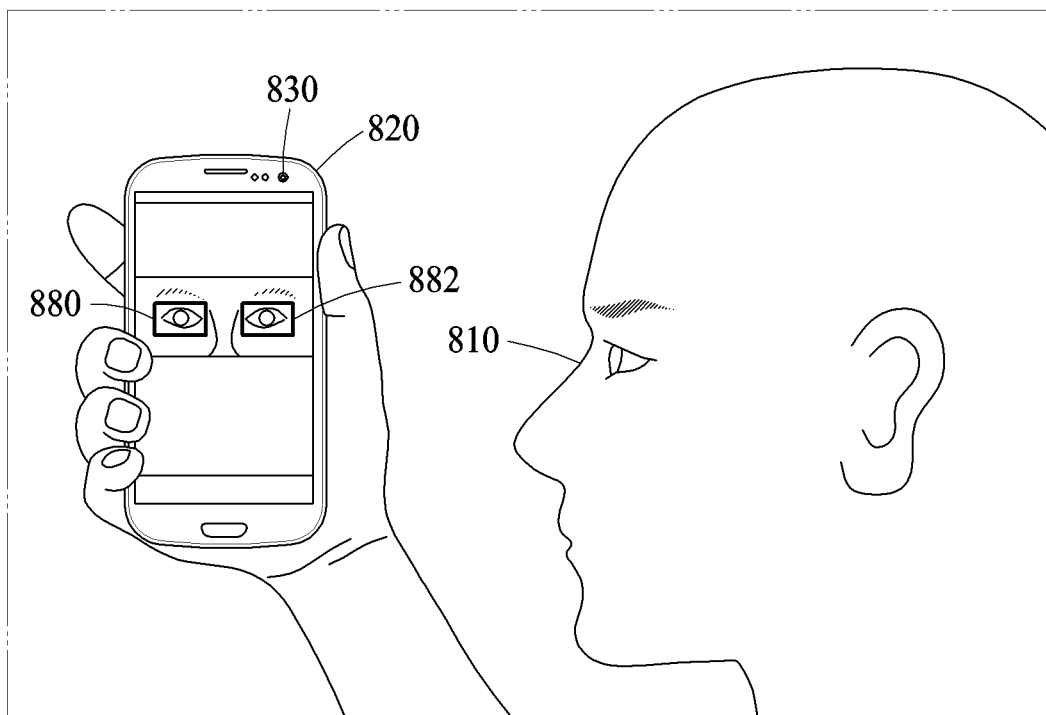
Figure 8D:
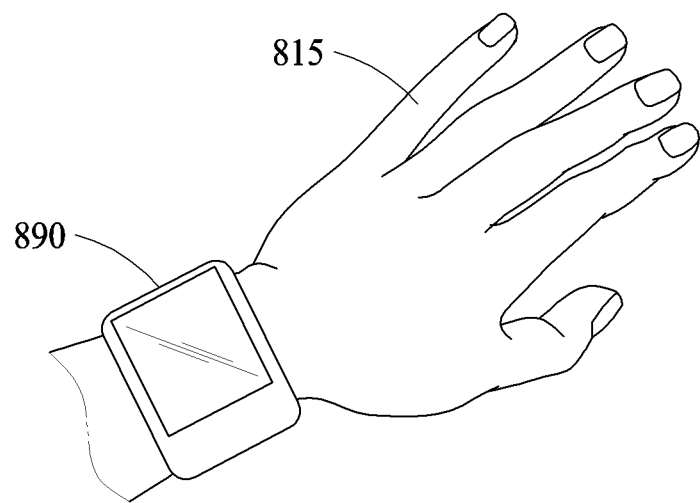
Figure 8E:
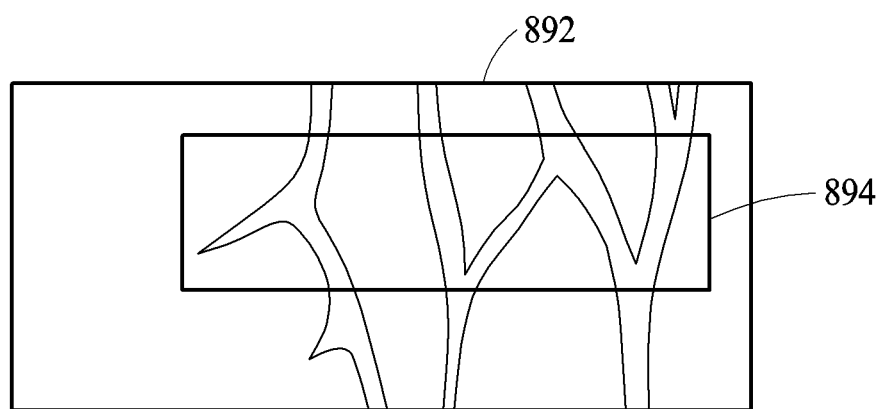

As brief example of the user authentication or identification herein, FIGS. 8A-8E illustrate respective authentications or identifications being used to authenticate or identify a valid user in a user-login, a payment service, or an access control, as non-limiting examples, where the computing apparatus is a mobile or wearable device. For example, any of FIGS. 8A-8E illustrate a corresponding computing apparatus 820 or 890 that may authenticate or identify a user 810 attempting to have an access to the computing apparatus 820 through authentication or identification. For example, when the user 810 is attempting at face authentication or identification to the computing apparatus 820 of FIG. 8A, e.g., to cancel a lock state of the computing apparatus 820, the computing apparatus 820 obtains a face image 840 of the user 810 using an image obtaining apparatus, for example, an image sensor or camera 830, and determines whether to cancel the lock state of the computing apparatus 820 by analyzing the obtained face image. In such an example, if a determined similarity between features extracted from an enrolled image stored in the enrolment DB of the computing apparatus 820 and features extracted from the face image 840 meets a predetermined threshold, then the user may be determined to be a valid user of the computing apparatus 820, the user may be permitted to gain access to a restricted area, or the user may be authorized to implement a financial transaction or payment, etc. The user may be notified of the successful verification through the display 825, or the example further operations may then be available through the display 825, as non-limiting examples. Similarly, FIG. 8B illustrates where the computing apparatus 820 captures a fingerprint image 850, as an example of the captured image, from a fingerprint sensor 817 of the computing apparatus 820, and compares extracted feature vectors of the captured fingerprint image 850 to enrolled fingerprint images 862-866 or corresponding enrolled feature vectors for the same in the corresponding enrollment DB in storage 860. FIG. 8C further illustrates that the computing apparatus 820 may capture one or more eye or iris images, e.g., either or both of eye or iris images 880 and 882, and compare the extracted feature vectors of the captured eye or iris images to corresponding enrolled feature vectors in a corresponding enrollment DB. Still further, FIGS. 8D and 8E illustrate that the computing apparatus may be wearable computing apparatus 890, which is configured with an image sensor and/or camera that captures, for example, a blood vessel image(s) 892 and/or 894 of the body portion 815, and configured to compare extracted feature vectors of the same to corresponding enrolled feature vectors in a corresponding enrollment DB, and similarly perform such authentication or identification. Here, though such examples are provided in FIGS. 8A-8E, such computing apparatuses may capture any combination or additional or alternate biometric information in varying examples and perform such authentication or identification, and such respective adaptive enrollment DB updating, with corresponding enrollment DBs.

Referring back to FIG. 1, in operation 110, the computing apparatus extracts an input feature vector from an input image. As noted, depending on example or combination of examples, the input image may be, for example, an image including unique features of various body parts of a user such as a face, an iris, a fingerprint, or blood vessel of the user. The "input feature vector" is a feature vector extracted from the input image and represents, as only non-limiting examples, respective features for face recognition, iris recognition, fingerprint recognition, or blood vessel recognition, as discussed above. To extract the input feature vector from the input image, the computing apparatus is configured to implement various feature extraction schemes, for example, a local binary pattern (LBP) scheme, a Gabor scheme, and/or various deep learning schemes in various examples. For example, a processor of the computing apparatus may be configured to implement any of such feature extraction schemes, and thereby extract such features. Here, the extracted features will be referred to as feature vectors, e.g., as an example of the form of a result of such feature extraction, while noting that examples are not limited thereto.

Thus, in operation 120, the computing apparatus determines whether the input or extracted feature vector is included within a changeable enrollment range defined by the current enrolled images. The changeable enrollment range may be determined based on a threshold distance, e.g., a same or respective threshold distances or based on the same, from each of the enrolled feature vectors in the enrolment DB respectively corresponding to enrolled images. Accordingly, the "changeable enrollment range" is understood herein to indicate that a range that is determined by such a threshold distance from each of the enrolled feature vectors is changeable within a predetermined range instead of being fixed to a value (for example, a distance or a similarity), such as by an addition of the input feature vector and/or a replacement of an enrolled feature vector with the input feature vector. The predetermined range corresponds to, for example, a current range from a minimum threshold distance from each of the enrolled feature vectors in the enrolment DB to a maximum threshold distance from each of the enrolled feature vectors in the enrolment DB, such as further demonstrated below with respect to FIGS. 2 and 3. The changeable enrollment range is also referred herein to as a "systematic enrollment range."

The enrolled feature vectors are feature vectors enrolled and included in the enrollment DB. The enrolled feature vectors may include initially enrolled feature vectors, where the "initially enrolled feature vectors" are feature vectors enrolled in the enrollment DB through a user authentication process during an initial enrollment process, for example. The total or maximum number of initially enrolled feature vectors may be set in advance of the enrollment process, for example. The corresponding changeable enrollment range of the enrolled feature vectors may then be defined or determined based on any one or any combination of respective similarities between the enrolled feature vectors, a minimum threshold distance from each of the enrolled feature vectors, and a maximum threshold distance from each of the enrolled feature vectors. The similarities between the enrolled feature vectors includes, for example, a normalized cross-correlation (NCC) between the enrolled feature vectors.

The changeable enrollment range may be used to mutually restrict a future change between the enrolled feature vectors in the enrollment DB based on changeable threshold distances (for example, the minimum threshold distance and the maximum threshold distance) for each of the enrolled feature vectors. An example of the changeable enrollment range is further described with reference to FIG. 2.

In operation 120, the computing apparatus performs authentication of the input feature vector and determines whether the input feature vector corresponds to an outlier, e.g., determining whether the input feature vector is included in or outside of the changeable enrollment range. Herein, the "outlier" is understood to be a feature vector corresponding to an image of another user or person other than a current user for which the authentication is being performed, even when authentication is successful.

Accordingly, in operation 120, the computing apparatus determines whether the input feature vector corresponds to being an outlier based on the enrolled feature vectors. For example, the computing apparatus calculates a minimum distance or a maximum similarity between the input feature vector and each of the enrolled feature vectors, and determines whether the input feature vector is the outlier based on the minimum distance or the maximum similarity. The minimum distance may be determined based on, for example, an enrolled feature vector determined farthest from the input feature vector.

The computing apparatus may thus determine whether the input feature vector is the outlier based on whether the minimum distance is greater than an update threshold that is set in advance for controlling whether to update the enrollment DB. As a non-limiting example, the update threshold may be set to, for example, a threshold distance or a threshold similarity corresponding to a false acceptance rate (FAR) of 1%. The FAR is a rate of other people being falsely recognized as a user.

Also, in operation 120, the computing apparatus determines whether a feature range of the enrollment DB would be increased based on the input feature vector and the changeable enrollment range of the enrolled feature vectors, to determine whether the input feature vector will be included in the changeable enrollment range. The "feature range of the enrollment DB" is understood herein as a range of characteristics of a user's face or appearance that are recognizable using the enrolled feature vectors in the enrollment DB, e.g., with each enrolled feature vector representing different overlapping or different extracted features for such varying characteristics of the user's face or appearance. Also, an "increase in the feature range" is understood herein to correspond to a diversifying of recognizable changes in the characteristics of the user's face or appearance provided by the addition or varying of the enrolled images included in the enrollment DB. For example, as the face of the user may vary at different times according to various characteristics or appearance elements such as in makeup style, hair style, facial hair, use of glasses or different glass styles, or weight, the desired feature range could also vary for more accurate authentication or identification, for example. Here, though examples are made with respect to the example face image or potential varying of characteristics or appearance of the user, examples are not limited thereto and the example image may alternatively be the aforementioned fingerprint image, eye image, or blood vessel image with the enrolled images likewise being corresponding fingerprint images, eye images, or blood vessel images with respective fingerprint feature vectors, eye feature vectors, and blood vessel feature vectors being stored in respective enrollment DBs representative of corresponding various characteristics or appearance elements, and thus the discussion herein is also with respect to such alternative examples where the computing apparatus selectively updates the corresponding enrollment DBs and performs such authentication or identification of the user with the corresponding enrollment DBs where the corresponding feature ranges are controlled.

The computing apparatus may determine whether the feature range would be increased based on whether the input feature vector satisfies a first condition and a second condition, for example.

In such an example, the "first condition" may be understood as a condition that the input feature vector is within a first threshold distance from an enrolled feature vector farthest from the input feature vector. The "second condition" may be understood as a condition that the input feature vector is included in a changeable enrollment range (for example, an enrollment range 360 of FIG. 3) of the enrolled feature vectors. In an example, such distances may be determined Euclidean distances that may also be inversely proportional to the similarities between images. Examples of consideration of the first condition and the second condition are further described with reference to FIG. 3.

In operation 130, the computing apparatus determines whether to enroll the input feature vector in the enrollment DB, based on a determination result of operation 120.

In an example, when the input feature vector satisfies the first condition, the computing apparatus may determine to add the input image to the enrollment DB.

In another example, when the input feature vector satisfies the first condition and the second condition, the computing apparatus may determine to replace one of the already enrolled feature vectors with the input feature vector. For example, the computing apparatus determines to replace an enrolled feature vector among the enrolled feature vectors with the input feature vector based on whether a threshold distance from each of the enrolled feature vectors or a changeable enrollment range of the enrolled feature vectors would be increased with the replacement of the input feature vector for the enrolled feature vector. In this example, a distance between the input feature vector and the enrolled feature vector that is to be replaced is greater than a replacement threshold. This threshold distance may be heuristically determined, for example.

The computing apparatus may thus replace an enrolled feature vector with the input feature vector so that changes in input images of the user are adaptively reflected in the enrollment DB. For example, when respective authentication regions, by a threshold distance from each of the enrolled feature vectors, overlap each other, the computing apparatus may replace an enrolled feature vector included in the overlapping authentication regions with the input feature vector.

For example, the computing apparatus determines whether to replace an enrolled feature vector with the input feature vector, based on a cumulative feature distance S between the input feature vector and each of the enrolled feature vectors. In this example, the computing apparatus calculates cumulative feature distances respectively corresponding to the input feature vector and the enrolled feature vectors by a sum of distances between the input feature vector and the enrolled feature vectors. In an example, when an input feature vector is denoted by y and enrolled feature vectors are denoted by x1, x2, x3, x4 and x5, the computing apparatus acquires a cumulative feature distance S0 corresponding to the input feature vector y by adding up distances between the input feature vector y and the enrolled feature vectors x1, x2, x3, x4 and x5. Also, the computing apparatus acquires a cumulative feature distance S1 corresponding to the enrolled feature vector x1 by adding up a distance between the enrolled feature vector x1 and the input feature vector y and distances between the enrolled feature vector x1 and the enrolled feature vectors x2, x3, x4 and x5. Similarly, the computing apparatus acquires cumulative feature distances S2, S3, S4, and S5 respectively corresponding to the enrolled feature vectors x2, x3, x4 and x5.

The computing apparatus determines whether the cumulative feature distance S0 is greater than one of the cumulative feature distances S1, S2, S3, S4, and S5. For example, when the cumulative feature distance S0 is greater than any one or any combination of the cumulative feature distances S1, S2, S3, S4, and S5, the computing apparatus determines to replace one of the enrolled feature vectors x1 through x5 with the input feature vector y. The computing apparatus may determine to replace an enrolled feature vector corresponding to the minimum cumulative feature distance among the cumulative feature distances S0 through S5 with the input feature vector y. In this example, the enrolled feature vector corresponding to the minimum cumulative feature distance may thus correspond to an enrolled feature vector included in the example overlapping region between authentication regions. For example, an enrolled feature vector included in the overlapping region between authentication regions may be replaced with an input feature vector that may represent a new feature of the user's image, and thus the enrollment DB adaptively reflects changes in the input image of the user over time.

In an example, the computing apparatus may acquire an average feature (for example, a representative vector) between an input feature vector that is determined not to be an outlier and enrolled feature vectors farthest from the input feature vector. In this example, an enrolled feature vector close to the representative vector may be highly likely to be in an overlapping region between authentication regions of the enrolled feature vectors farthest from the input feature vector. Thus, the computing apparatus may determine to replace the enrolled feature vector close to the representative vector with the input feature vector.

In another example, the computing apparatus may determine to replace, with an input feature vector, an enrolled feature vector that is most frequently representative of a limiting element or impediment during considerations for whether the input feature vector should be added or replace an enrolled feature vector.

For example, a user who did not previously wear glasses may be assumed to eventually wear glasses because the user's eyesight deteriorates over time. In this example, at a time after initial enrollment of the enrolled images, an image that is input for user authentication may correspond to a face of the user wearing glasses. An enrolled feature vector (for example, an enrolled feature vector representing a feature of the user who did not wear glasses) may correspond to being farthest from the input feature vector corresponding to the input image among enrolled feature vectors stored in an enrollment DB and thus may be representative of an element that may have limited previous enrollments of input feature vectors or replacements of enrolled feature vectors with such input feature vectors reflecting the changed feature. Here, this example farthest enrolled feature vector accordingly could interrupt the reflection into the enrollment DB of the more current feature (for example, wearing glasses) that has changed in the face of the user, but the enrollment DB may still be updated if this farthest enrolled feature vector is identified and considered. Thus, a continuously maintained change in the input image may be recognized as a change that is desirable to be taken into consideration for user authentication, and may thus be reflected in the enrollment DB.

In this example, the computing apparatus may thus count the number of times that each of the enrolled feature vectors was a farthest enrolled feature vector, and/or limiting of the corresponding addition of a corresponding input feature vector and/or replacement with the corresponding input feature vector. When the counted number of times for any of the enrolled feature vectors exceeds a threshold number of times, the computing apparatus may determine to replace, with an input feature vector, the corresponding enrolled feature vector, e.g., the current or next time the corresponding enrolled feature vector is the farthest enrolled feature vector. For example, when the example threshold number of times is set to "3" and when the counted number of times corresponding to an enrolled feature vector a becomes "4," the computing apparatus may determine to replace the enrolled feature vector a with the current input feature vector. In this example, the threshold number of times is used to determine whether to add the input feature vector or to replace one of the enrolled feature vectors with the input feature vector. The threshold number of times may be heuristically determined. The computing apparatus may also store the respective count values corresponding to each of the enrolled feature vectors and/or the input feature vector limited by each of the enrolled feature vectors, and the stored count values considered for each evaluation of an input feature vector for subsequent determinations of whether to add the input feature vector or to replace the corresponding enrolled feature vector whose count exceeds the threshold number of times.

In operation 140, the computing apparatus may thus enroll the input feature vector in the enrollment DB based on the result of the determination of operation 130. The "enrolling" of the input feature vector in the enrollment DB is understood herein to include enrolling the input feature vector as an initially enrolled feature vector in the enrollment DB, adding the input feature vector to the enrolled feature vectors, and replacing one of the enrolled feature vectors with the input feature vector. As discussed below, the enrolling of a feature vector as an initially enrolled feature vector may include considering different enrollment images when initially building the enrollment DB, such as in an enrollment operation, to build the enrollment DB with a varied and/or wide feature range.

Figure 2:
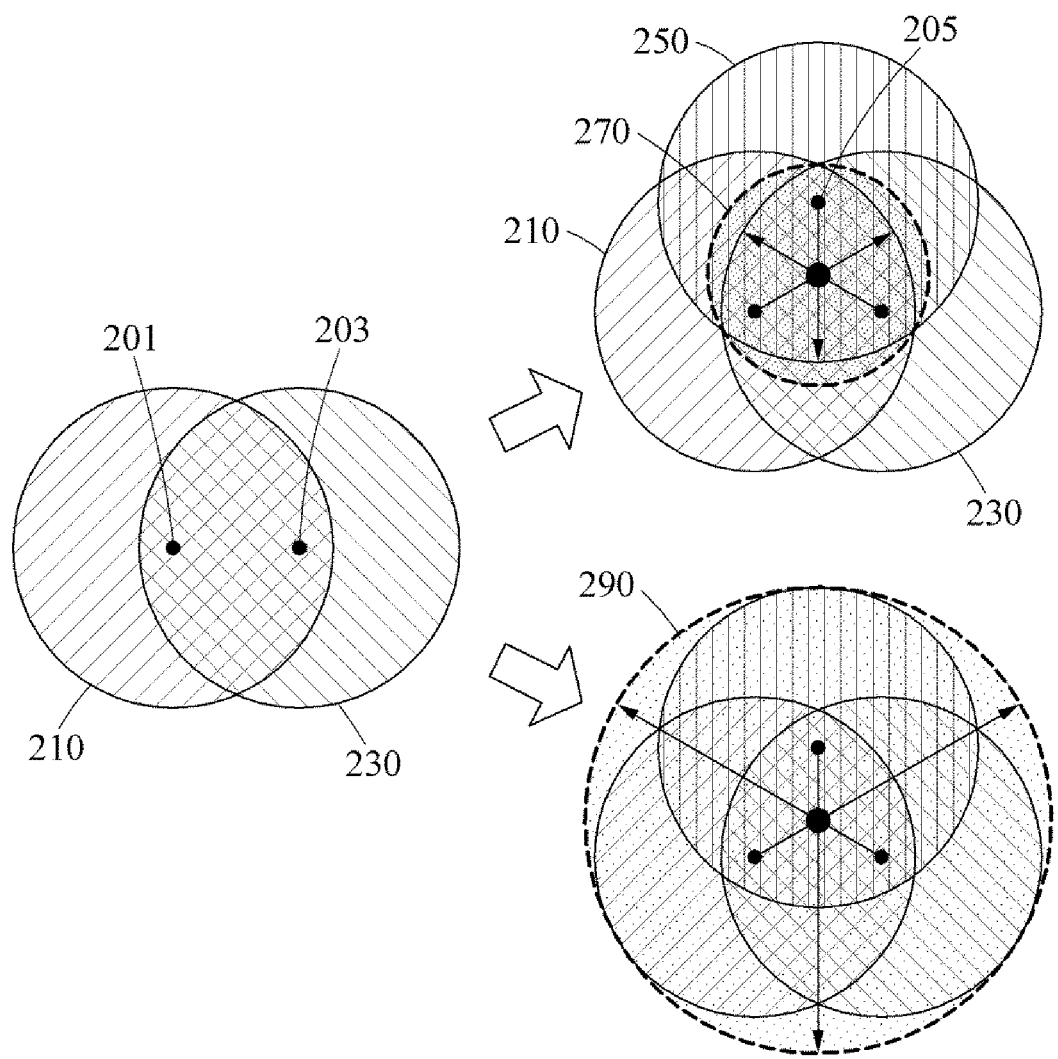
FIG. 2 illustrates changeable enrollment range examples of enrolled feature vectors.

FIG. 2 illustrates changeable enrollment range examples of enrolled feature vectors. For example, FIG. 2 illustrates changeable enrollment ranges 270 and 290 of enrolled feature vectors 201, 203 and 205 after or if the enrolled feature vector 205 is added to the enrolled feature vectors 201 and 203.

In FIG. 2, the illustrated circle 210 represents an authentication region or an authentication range by a corresponding threshold distance from the enrolled feature vector 201, and the illustrated circle 230 represents an authentication region by a corresponding threshold distance from the enrolled feature vector 203. Similarly, the illustrated circle 250 represents an authentication region by a corresponding threshold distance from the enrolled feature vector 205.

Although the example authentication regions determined or defined based on the respective threshold distances from the enrolled feature vectors are represented by respective circles, this is merely for convenience of explanation in FIG. 2, and examples are not limited thereto. For example, though demonstrated as a same distance in all directions from each enrolled feature vector, the circumference or boundary of the respective authentication regions may be defined otherwise, such as based on multi-threshold formulas. Also, while the respective threshold distances may be the same for multiple or all of the authentication regions, such as demonstrated by the illustrated equal radii regions surrounding each enrolled feature vector in FIG. 2, embodiments are not limited thereto. Accordingly, example implementations based on various schemes of representing the multidimensional space are also available.

The example changeable enrollment range 270 may be determined by or based on respective minimum threshold distances from each of the enrolled feature vectors 201, 203, and 205, and the example changeable enrollment range 290 may be determined by or based on respective maximum threshold distances from the enrolled feature vectors 201, 203, and 205.

In an example of a user's face, various changes over time are expressed by changes in facial expressions, changes in a skin color, e.g., based on a lighting and interior and exterior environments, or changes in makeup style, glasses, facial hair, or hat or mask coverings. It may be difficult to express all the above changes based on a single enrolled image if an authentication algorithm is desired to be robust against the above changes. Thus, to recognize a face, one or more examples utilize multidimensional-enrolled feature vectors that may each represent various features of the face in a single vector of the corresponding multidimensional space. Dimensions of the enrolled feature vectors may, for example, each have thousands of dimensions or hundreds of dimensions, with each of the dimensions representing various features to be available for providing a wide or varied feature region for a user, thereby providing a highly robust and more accurate authentication or identification based on the stored enrolled feature vectors.

For example, in an example, an authentication region may be wide based on a plurality of selectively varied enrolled feature vectors, e.g., with selectively enrolled feature vectors with wide distances there-between, and thus be robust against a change. Such a selective variance may be implemented in an initial enrollment example, as a non-limiting example.

However, considering the potential occurrence of a false acceptance between an input image and the enrolled images, it may be impossible to indefinitely extend the feature region of the enrolled images or respective authentication regions of the corresponding enrolled feature vectors without reducing accuracy, for example. Accordingly, in an example, the extent of the feature region of the enrolled images, in the initial enrollment, in subsequent addition, or subsequent replacement of enrolled feature vectors may be performed by taking into consideration such a potential for false acceptances.

In another example, an extension of an authentication region may be restricted by the changeable enrollment range of multiple enrolled feature vectors. To secure various feature vectors each representing multiple dimensions, the extension of one authentication region may be restricted by the changeable enrollment range corresponding to all the enrolled feature vectors instead of using a single representative feature vector. For example, with the example of FIG. 2, an extension of an authentication region of the enrolled feature vector 201 may be restricted or constrained by the changeable enrollment ranges 270 or 290.

For example, the computing apparatus may verify a relationship between an input feature vector corresponding to a new input image and enrolled feature vectors included in an enrollment DB, and determine whether to add the input feature vector and/or to replace one of the enrolled feature vectors with the input feature vector.

For example, "N" enrolled feature vectors may be stored in the enrollment DB. In this example, N is a natural number. Based on consideration of the existing feature range reflected by the enrolled feature vectors, the computing apparatus may selectively add and enroll the input feature vector corresponding to the new input image in the enrollment DB, and/or replace one of the enrolled feature vectors with the input feature vector.

In this example, the computing apparatus may perform a mutual restriction or a mutual check between the "N" enrolled feature vectors to prevent the "N" enrolled feature vectors from being too far away from each other and/or too close to each other, based on a determined NCC between the "N" enrolled feature vectors or corresponding threshold distances (for example, a minimum threshold distance and/or a maximum threshold distance) from each of the "N" enrolled feature vectors. The computing apparatus may thus determine an enrollment range that is used to determine whether to add the input feature vector or to replace one of the enrolled feature vectors with the input feature vector, through the performed mutual restriction between the enrolled feature vectors. In an example, the enrollment range may thus correspond to, for example, a nonlinear region.

Through the mutual restriction between the enrolled feature vectors, the computing apparatus may thereby restrict too frequent of changes, expansion, or movement of an authentication region, while still permitting such updates instead of a fixing of a predetermined feature vector without such update availability. In an example, the "mutual restriction between the enrolled feature vectors" may be understood to indicate or mean that a changeable enrollment range of the enrolled feature vectors is determined or defined based on a threshold distance from each of the enrolled feature vectors or an authentication region by the threshold distance and that increasing or reducing of the threshold distance is restricted.

Thus, in an example, through such mutual restriction between the enrolled feature vectors, it may also be possible to maximally increase an enrollment range in which the input feature vector is to be added and/or one of the enrolled feature vectors is replaced with the input feature vector, and possible to reduce a possibility of a false acceptance.

In an example, the computing apparatus may determine whether to enroll an input feature vector extracted from an input image in the enrollment DB, based on a result obtained by determining whether the input feature vector satisfies a changeable enrollment range of enrolled feature vectors. For example, in an example, the computing apparatus may enhance a recognition rate by adding feature vectors of various dimensions instead of adding a plurality of feature vectors of the same dimension or focused on a single extractable feature. As noted above, and similarly to the addition of enrolled feature vectors, the computing apparatus may allow a maximum diversity of enrolled feature vectors to be ensured so that important enrolled feature vectors are not too frequently replaced even when enrolled feature vectors are replaced.

For example, the computing apparatus may determine whether to enroll the input feature vector in the enrollment DB, based on whether a feature range of the enrollment DB is increased based on the input feature vector and a changeable enrollment range of enrolled feature vectors.

In this example, when the input feature vector satisfies a first condition that the input feature vector is within a threshold distance from an enrolled feature vector farthest from the input feature vector, the computing apparatus may determine to add the input feature vector to the enrollment DB. When the input feature vector satisfies a second condition in addition to the first condition, the computing apparatus may determine to replace one of the enrolled feature vectors with the input feature vector.

Also, whether the input feature vector satisfies the first condition and/or the second condition may be determined based on whether the example threshold distance is determined as a minimum threshold distance, similarly to the changeable enrollment range 270 of FIG. 2, or determined as a maximum threshold distance, similarly to the changeable enrollment range 290 of FIG. 2.

Such threshold distances may also be heuristically determined as an appropriate value through various experiments, and thus it is possible to maximally increase a changeable enrollment range of enrolled feature vectors and possible to reduce a possibility of a false acceptance.

In another example, when the input feature vector satisfies the first condition that the input feature vector is within a threshold distance from an enrolled feature vector farthest from the input feature vector, and when a threshold distance from an enrolled feature vector second farthest from the input feature vector satisfies a predetermined threshold range (for example, a distance of at least "0.08" compared to the farthest enrolled feature vector), the computing apparatus may determine to add the input feature vector to the enrollment DB.

Accordingly, with such constrains on controlling when to add or replace feature vectors in the enrollment DB, the computing apparatus may exclude an enrollment or addition of an input feature vector corresponding to another person's region (for example, as corresponding to an outlier) based on both a distance between the farthest enrolled feature vector and the input feature vector and a distance between the second farthest enrolled feature vector and the input feature vector. For example, when all distances between the input feature vector and the enrolled feature vectors are less than a maximum threshold distance as shown in the changeable enrollment range 290, the input feature vector may be determined to be an outlier corresponding to another person. Also, the enrollment of the outlier may be more precisely excluded by adjusting the threshold distance from the second farthest enrolled feature vector by a predetermined threshold range.

In still another example, when the input feature vector satisfies the first condition and when a cumulative feature distance between the input feature vector and all the enrolled feature vectors in the enrollment DB satisfies a predetermined threshold range, the computing apparatus may determine to add the input feature vector to the enrollment DB. In this example, the threshold range may include a maximum value and a minimum value, and changes in proportion to the number of enrolled feature vectors in the enrollment DB. For example, the threshold range may decrease as the number of enrolled feature vectors increases, and the threshold range may increase as the number of enrolled feature vectors decreases.

To exclude an enrollment of an input feature vector at a maximum threshold distance from each of all enrolled feature vectors, or an input feature vector within a minimum threshold distance from each of all the enrolled feature vectors, a predetermined threshold range may thus be adjusted, and an authentication region of each of the enrolled feature vectors also adjusted.

Figure 3:
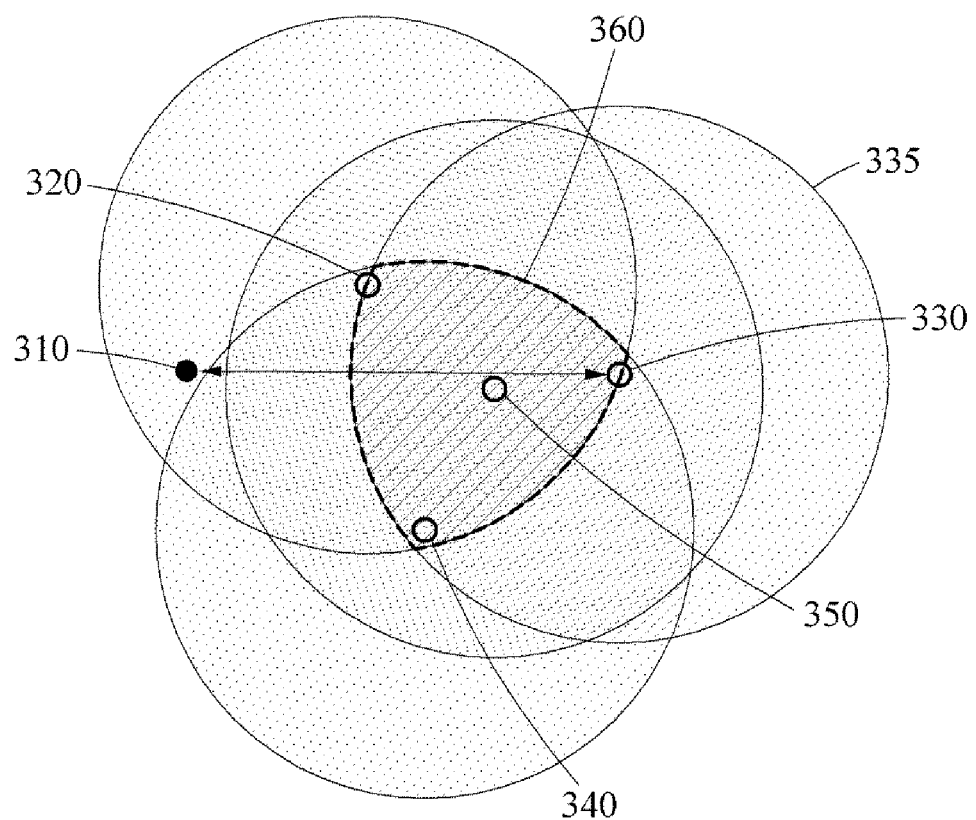
FIG. 3 illustrates an example of a first condition and a second condition determinative of enrollment.

FIG. 3 illustrates an example of a first condition and a second condition determinative of enrollment. FIG. 3 illustrates an input feature vector 310 corresponding to an input image, and enrolled feature vectors 320, 330, 340, and 350.

For example, the enrolled feature vectors 320 through 350 are stored in an enrollment DB, e.g., in a memory of the computing apparatus, and when performing an authentication or identification operation with an extracted input feature vector 310, the computing apparatus may determine whether to add the input feature vector 310 to the enrollment DB, to replace one of the enrolled feature vectors 320 through 350 with the input feature vector 310, or to not perform either.

In this example, when the input feature vector 310 satisfies a first condition that the input feature vector 310 is within a threshold distance from the enrolled feature vector 330 that is farthest from the input feature vector 310, the computing apparatus may determine to add the input feature vector 310 to the enrollment DB, e.g., for consideration in a next authentication or identification operation. As illustrated, though only as an example, the threshold distance from the enrolled feature vector 330 corresponds to the circle 335 centered on the enrolled feature vector 330. Because the input feature vector 310 is not within a radius of the circle 335 as shown in FIG. 3, the computing apparatus determines to not add the input feature vector 310 to the enrollment DB.

Also, when the input feature vector 310 satisfies both the first condition and a second condition, e.g., that the input feature vector 310 is included in an overlapping region, for example, the illustrated enrollment range 360 determined based on a threshold distance from each of the enrolled feature vectors 320 through 350, the computing apparatus determines to replace one of the enrolled feature vectors 320 through 350 with the input feature vector 310. However, as illustrated in FIG. 3, because the input feature vector 310 is outside the example enrollment range 360, the computing apparatus determines to not replace an enrolled feature vector with the input feature vector 310.

Thus, the extent of change or extension of a region, with an addition of an input feature vector and/or a replacement of an enrolled feature vector with the input feature vector, can be restricted, e.g., compared to infinitely extending the region, based on a changeable enrollment range of the enrolled feature vectors. Also, respective threshold distances corresponding to each of the enrolled feature vectors may be heuristically and properly determined. Therefore, it is possible to store and adjust feature vectors with various features in an enrollment DB.

Figure 4:
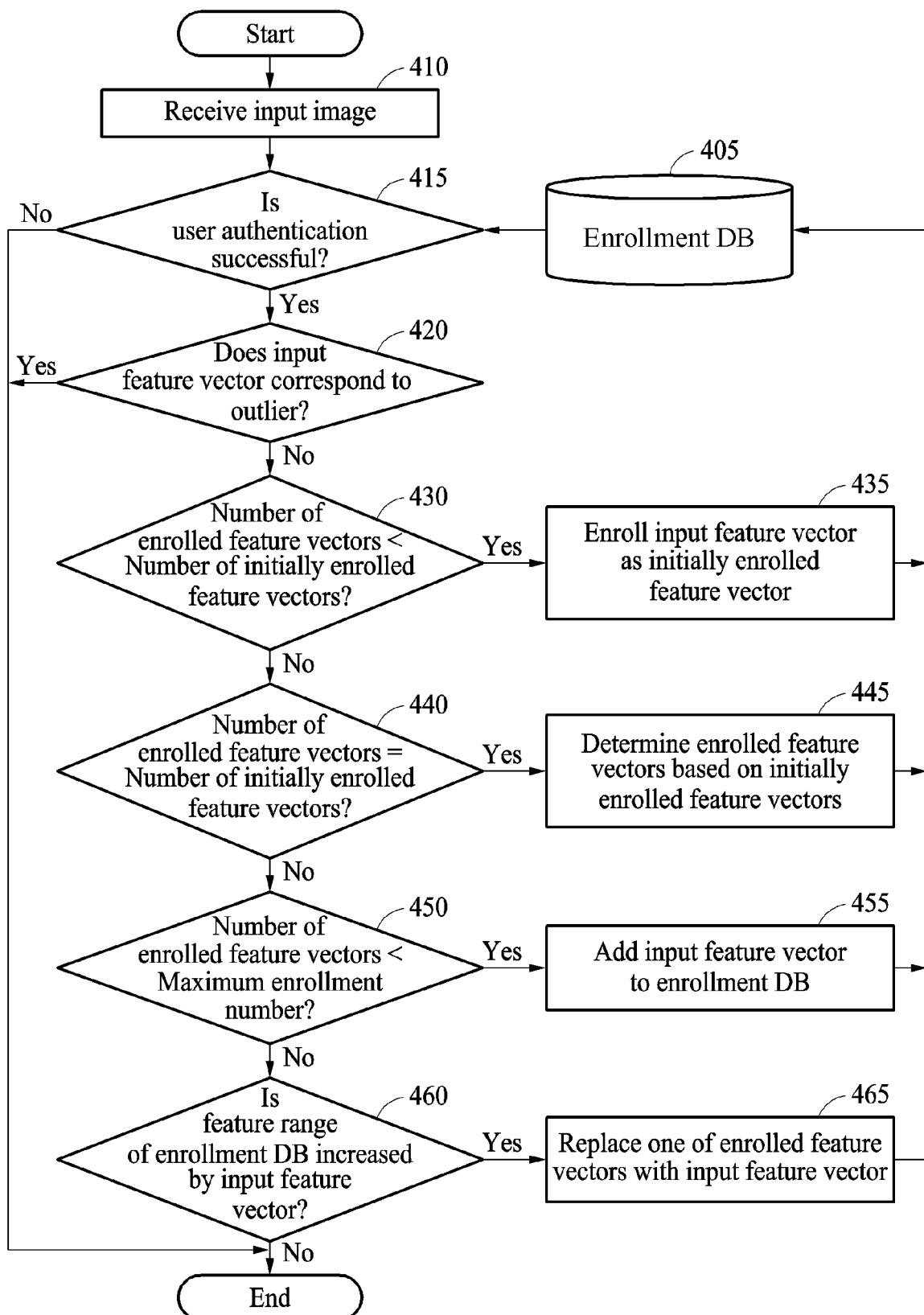
FIG. 4 is a flowchart illustrating an example of an adaptive updating algorithm of an enrollment DB.

FIG. 4 illustrates an example of an authentication or identification operation with an adaptive updating algorithm of an enrollment DB 405. Referring to FIG. 4, in operation 410, an computing apparatus receives or captures an input image. In operation 410, the computing apparatus extracts an input feature vector from the input image.

The computing apparatus performs user authentication, or identification in an alternate example. For example, in operation 415, the computing apparatus determines whether the example user authentication is successful, such as based on whether a distance between the input feature vector and any or each of enrolled feature vectors is less than a predetermined authentication threshold. For example, when the respective distances between the input feature vector and each of the enrolled feature vectors is less than the authentication threshold, the computing apparatus determines that the user authentication is successful. When the user authentication is determined to fail in operation 415, the computing apparatus may terminate the authentication operation and terminate further consideration of whether to perform adaptive updating of the enrollment DB 405, e.g., according to the example adaptive updating algorithm and thus without enrolling the input feature vector in the enrollment DB 405. When the user authentication is determined to be successful, the computing apparatus may then selectively enroll the input feature vector in the enrollment DB 405 based on whether conditions, for example, conditions of operations 420, 430, 440, 450 and 460, are further satisfied.

When the user authentication is determined to be successful in operation 415, the computing apparatus determines whether the input feature vector is an outlier in operation 420. For example, in operation 420, the computing apparatus determines, based on the enrolled feature vectors, whether the input feature vector is the outlier. The computing apparatus calculates a minimum distance or a maximum similarity between the input feature vector and each of the enrolled feature vectors. For example, when the calculated minimum distance is greater than a predetermined update threshold that is set in advance for controlling when to update the enrollment DB 405, the computing apparatus determines the input feature vector to be the outlier.

In an example, when the input feature vector is determined to be the outlier in operation 420, the computing apparatus terminates the adaptive computing algorithm instead of performing further consideration of whether to enroll the input feature vector in the enrollment DB 405. In another example, when the input feature vector is determined to not be the outlier in operation 420, the computing apparatus performs further considerations of whether to enroll the input feature vector in the enrollment DB 405.

For example, in an example initial enrollment of the computing apparatus, the computing apparatus may determine whether to enroll the input feature vector as an initially enrolled feature vector based on a comparison result between a current number of enrolled feature vectors and a predetermined number of initially enrolled feature vectors.

In this example, in operation 430, the computing apparatus may determine whether the total number of enrolled feature vectors in the enrollment DB 405 is less than the predetermined number of initially enrolled feature vectors. When the total number of enrolled feature vectors is determined to be less than the predetermined number of initially enrolled feature vectors in operation 430, the computing apparatus enrolls and stores the input feature vector as an initially enrolled feature vector in the enrollment DB 405 in operation 435.

When the total number of enrolled feature vectors is determined to not be less than the predetermined number of initially enrolled feature vectors in operation 430, the computing apparatus determines whether the total number of enrolled feature vectors is equal to the predetermined number of initially enrolled feature vectors in operation 440. When the total number of enrolled feature vectors is determined to be equal to the predetermined number of initially enrolled feature vectors in operation 440, the computing apparatus determines enrolled feature vectors based on the initially enrolled feature vectors in operation 445, e.g., the example initial enrollment process may be considered complete with plural authenticated enrolled feature vectors, thereby populating the enrollment DB 405.

Thereafter, considering whether a current input feature vector could or should be enrolled, e.g., at a post-initial enrollment time or operation or after the predetermined number of initially enrolled feature vectors has been met, the computing apparatus determines in operation 450 whether such an addition of the current input feature vector would result in a total number of enrolled feature vectors that would be less than a predetermined maximum enrollment number of the enrollment DB 405. The predetermined maximum enrollment number may be set to, for example, "30" in advance of the operations of FIG. 4. Also, in this example, if during a corresponding authentication or identification operation it is determined that such an initial enrollment operation has previously been performed, the method of FIG. 4 may skip operations 430 through 445, and proceed to operation 450. Also, in such an example, operation 420 may alternatively be performed in any of operations 450 through 465.

Thus, based on the result of operation 450, the computing apparatus may either consider to add the corresponding input feature vector to the enrollment DB 405, or replace one of the enrolled feature vectors with the corresponding input feature vector, e.g., respectively based on whether a distance between the input feature vector and each of the enrolled feature vectors is less than a predetermined addition threshold or a predetermined replacement threshold.

For example, when the total number of enrolled feature vectors is determined to be less than the predetermined maximum enrollment number in operation 450, the computing apparatus determines to consider whether to adds the input feature vector to the enrollment DB 405 in operation 455, in which the determination of whether to add the input vector is confirmed when the input feature vector satisfies a first condition.

When the total number of enrolled feature vectors is determined to be greater than or equal to the predetermined maximum enrollment number in operation 450, the computing apparatus in operation 460 determines whether a feature range of the enrollment DB 405 would be increased if the input feature vector were to replace an existing enrolled feature vector in the enrollment DB 405.

When the result of operation 460 is that the feature range would not to be increased by the replacement of an enrolled feature vector with the input feature vector, the computing apparatus terminates the adaptive updating algorithm without enrolling the input feature vector in the enrollment DB 405.

When the result of the operation 460 is that feature range would be increased by the replacement of an enrolled feature vector with the input feature vector, the computing apparatus considers whether to replace one of the enrolled feature vectors in the enrollment DB 405 with the input feature vector in operation 465. For example, in operation 465, the computing apparatus confirms a determination to replace one of the enrolled feature vectors with the input feature vector when the computing apparatus determines that the input feature vector satisfies the first condition and a second condition.

For example, when the input feature vector is determined to not be an outlier and satisfies a changeable enrollment range of the enrolled feature vectors to further increase a feature range or an authentication range of feature vectors of the enrollment DB 405, the computing apparatus may help ensure the diversity of the enrolled feature vectors in the enrollment DB 405 by replacing one of the enrolled feature vectors with the input feature vector.

Figure 5A:
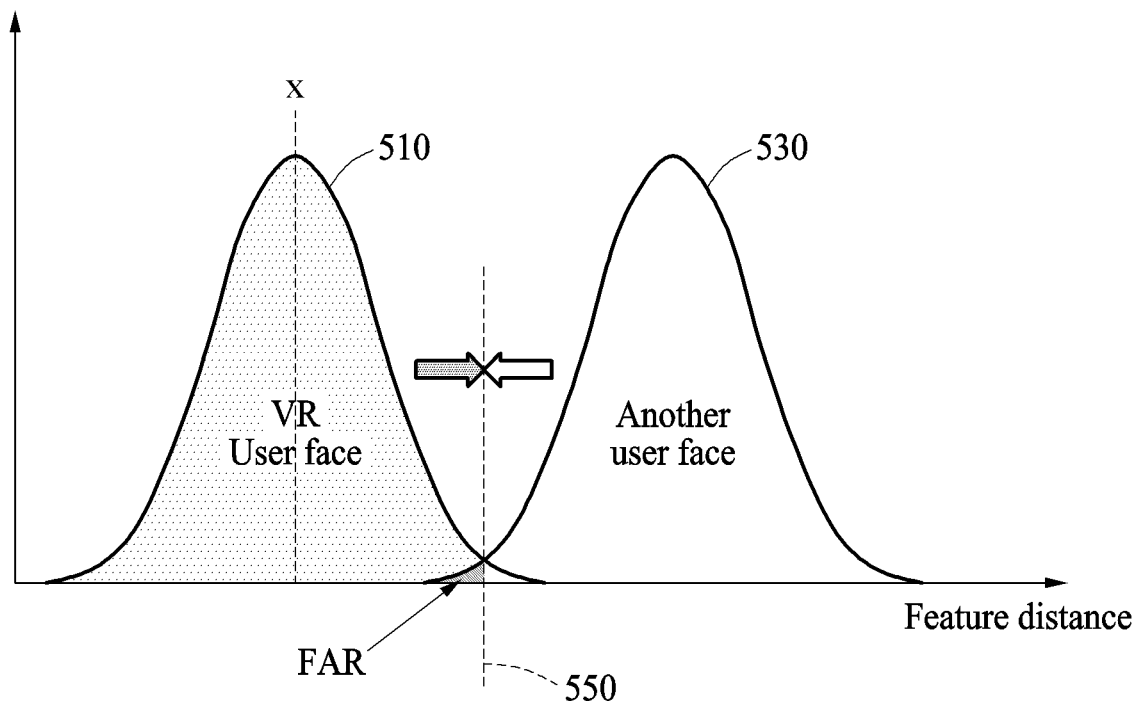
FIGS. 5A and 5B illustrate example methods of determining thresholds determinative of enrollment.
Figure 5B:
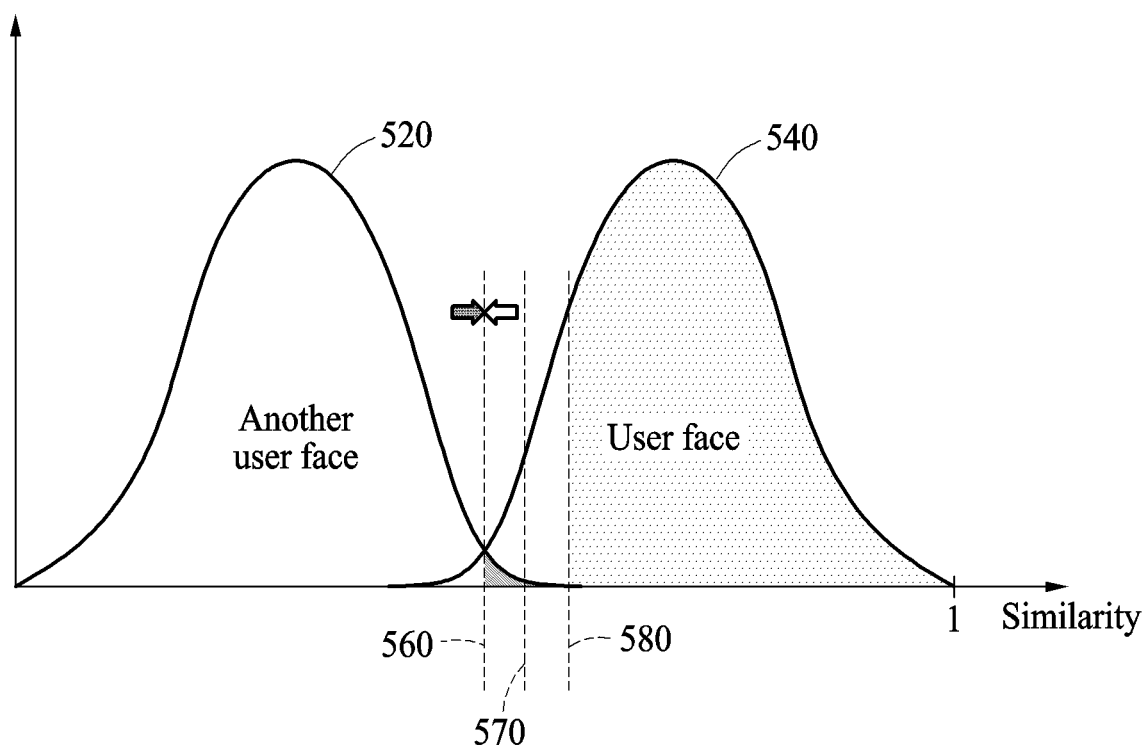

FIGS. 5A and 5B illustrate example methods of determining thresholds determinative of enrollment. The thresholds include, for example, a threshold distance or an authentication threshold for the user authentication, a threshold distance or a threshold similarity for the outlier determination, and a threshold distance or an addition threshold determinative of whether to perform the addition of an input feature vector to the enrollment DB and/or a replacement threshold determinative of whether to perform the replacement of an enrolled feature vector the input feature vector.

The thresholds are determined based on various performance indices. For example, the thresholds may be determined based on consideration of recognition rates (for example, verification rates (VRs)), FARs, false rejection rates (FRR), or various combinations thereof.

FIG. 5A illustrates a normal distribution curve 510 associated with feature distances between feature vectors corresponding to images of a user, and a normal distribution curve 530 associated with feature distances between feature vectors corresponding to images of another user or another person. A feature distance is referred to as a "distance" and may be a "Euclidean distance", for example, and may be understood as, for example, a distance that is inversely proportional to a similarity between images. In the graph of FIG. 5A, the x-axis represents a feature distance between feature vectors corresponding to two images, for example, and the y-axis represents a value of a probability density function corresponding to the feature distance.

To set an authentication threshold for the aforementioned user authentication based on a distance corresponding to an FAR of 1%, the computing apparatus may set, as the authentication threshold, a feature distance corresponding to an example determined boundary line 550 that represents the bottom, e.g., relative to the normal distribution curve 510, 1% of a total area under the normal distribution curve 530. For example, if an input feature vector is within an authentication threshold of an enrolled feature vector, then the input feature vector may be authenticated.

The computing apparatus may more strictly determine an addition threshold, for controlling whether to perform the addition of an input feature vector, compared to the authentication threshold. Also, the computing apparatus may more strictly determine the replacement threshold, for controlling whether to perform the replacement of an enrolled feature vector with the input feature vector, compared to the addition threshold. Such addition thresholds and replacement thresholds are discussed above, such as with respect to the corresponding addition determination operation 455 of FIG. 4 and the corresponding replacement determination operation 465 of FIG. 4, as non-limiting examples. The determining of the replacement threshold more strictly than the addition threshold may include, for example, determining the replacement threshold to have a higher similarity value or corresponding lower distance in comparison to the similarity value or distance represented by the addition threshold.

FIG. 5B illustrates a normal distribution curve 540 associated with similarities between images of the user, and a normal distribution curve 520 associated with similarities between images of another user or another person. In the graph of FIG. 5B, the x-axis represents a similarity ($0 \leq x \leq 1$) between two images, for example, and the y-axis represents a value of a probability density function corresponding to the similarity.

To set an authentication similarity for the aforementioned user authentication based on a similarity corresponding to an FAR of 1%, the computing apparatus may set, as the authentication similarity, a similarity corresponding to an example boundary line 560 that represents the bottom, e.g., relative to the normal distribution curve 540, 1% of a total area under the normal distribution curve 520.

The computing apparatus may more strictly determines an addition similarity for controlling whether to perform the addition of an input feature vector compared to the authentication similarity. Also, the computing apparatus may more strictly determine a replacement similarity for controlling whether to perform the replacement of an enrolled feature vector with the input feature vector compared to the addition similarity. As noted above, such addition similarity and replacement similarity are discussed above, such as with respect to the corresponding addition determination operation 455 of FIG. 4 and the corresponding replacement determination operation 465 of FIG. 4, as non-limiting examples. As a non-limiting example of the respective strictness of the addition and replacement similarities, the computing apparatus may set a similarity of the determined boundary line 570 corresponding to an FAR of 0.01% as the addition similarity, and set a similarity of the determined boundary line 580 corresponding to an FAR of 0.001% as the replacement similarity. In such examples, where the normal distribution curves 530 or 520 of particular other people are not known, or multiple other known users or people are considered, such example boundary lines may be determined based on training distribution curves derived from example feature vectors for various other known or training users or people. As another example, the various distribution curve(s) may be of other users of the computing apparatus, such as where the computing apparatus is configured to authenticate plural users of the computing apparatus, or the computing apparatus may be configured to identify a user (or person) from among different pre-identified people whose respective feature vectors are considered, as non-limiting examples and noting that alternatives are also available.

Figure 6:
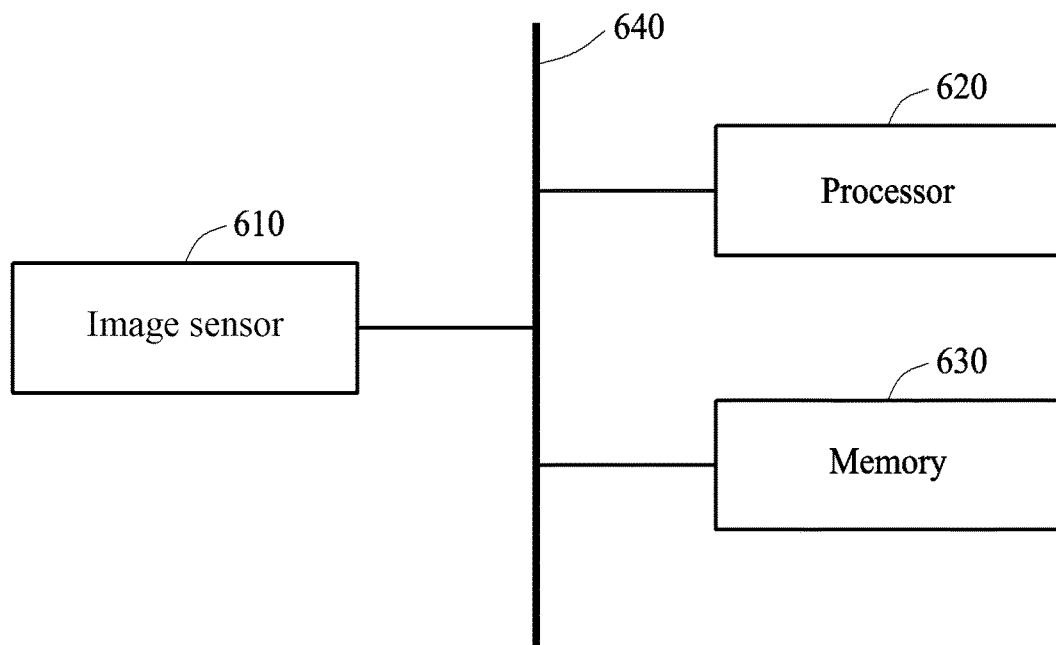
FIG. 6 is a block diagram illustrating an example of a computing apparatus configured to adaptively update an enrollment DB.

FIG. 6 is a block diagram illustrating an example of a computing apparatus 600 configured to adaptively update an enrollment DB. Referring to FIG. 6, the computing apparatus 600 includes an image sensor 610, a processor 620, and a memory 630. The image sensor 610, the processor 620, and the memory 630 communicate with each other via a bus 640.

The image sensor 610 captures an input image. The image sensor 610 is representative of one or more image sensors of the same or varied sensing types. The input image may be, for example, an image including various body parts of a user such as a face, an iris, a fingerprint of the user, or blood vessels, such as demonstrated in FIGS. 8A-8E. Feature areas of the image may be identified, such as in the example of facial elements being detected, to differentiate such particular body parts from larger captured images of the image sensor 610. The identified feature area may correspond to the input image or the captured image of the image sensor 610 may correspond to the input image.

The processor 620 extracts an input feature vector from the input image. The processor 620 determines whether the input feature vector is included in a changeable enrollment range of one or more users or known people of the computing apparatus 600. The processor 620 determines, based on a determination result, whether to enroll the input feature vector in a corresponding enrollment DB. Thus, the processor 620 selectively enrolls the input feature vector in the enrollment DB based on a result of the determination to whether to enroll the input feature vector in the corresponding enrollment DB. For example, the processor 620 may perform any, any combination, or all operations discussed above with respect to FIGS. 1-5B and 8A-8E.

Accordingly, the processor 620 may determine whether a feature range of the corresponding enrollment DB would be increased based on the input feature vector and the changeable enrollment range. For example, the processor 620 may determine whether the feature range would be increased based on whether the input feature vector satisfies a first condition that the input feature vector is within a threshold distance from an enrolled feature vector of the corresponding enrollment DB farthest from the input feature vector, and a second condition that the input feature vector is included in the changeable enrollment range for the corresponding enrollment DB.

The processor 620 may execute any, any combination, or all operations discussed herein through hardware or through a combination of hardware and software, such as with the processor 620 being configured to execute instructions which thereby controls the computing apparatus 600 to implement any, any combination, or all operations discussed herein. The executable instructions may be stored in the memory 630, for example. In addition, the computing apparatus 600 may be connected to an external device, for example, another computing apparatus such a PC or a network or server, via input/output or network interface hardware or hardware/software combinations, and may exchange data with the external device. For example, the computing apparatus 600 may obtain the adjusted or adjustable enrollment DB from the external device, as well as provide updates of the adjusted enrollment DB to the external device. The external device may further perform updates to the computing apparatus 600 for the example feature extractors of the computing apparatus 600 used in the extracting of the feature vector of input images. The external device may also provide the aforementioned determined thresholds or information of the other user or other people feature vector distributions to the computing apparatus 600 for the computing apparatus 600 consideration when determining the respective thresholds, as discussed above.

The memory 630 stores the corresponding enrollment DB, as well as any other enrollment DBs of other users of the computing apparatus 600, and thus includes the enrolled feature vectors of the corresponding enrollment DB. The memory 630 may also store the extracted input feature vector and the enrolled feature vectors. The memory 630 may still further store an input image corresponding to the input feature vector that is determined for enrollment in the enrollment DB, as well as corresponding enrolled images of the enrolled feature vectors in the enrollment DB. The memory 630 includes, for example, a volatile memory or a non-volatile memory, and represents one or more such memories.

As noted, in an example, the computing apparatus 600 is implemented as hardware. In still another example, the computing apparatus 600 is implemented as a combination of hardware and software, where one or more functions are implemented through execution of instructions by the processor 620 or another processor, and one or more functions are implemented by corresponding hardware as a specially configured processor, specially configured portions of the processor 620, or other hardware of the computing apparatus 600. In such an example, the processor 620 and the other hardware may exchange signals with each other via, for example, the bus 640 or another input/output bus or network interface.

The computing apparatus 600 includes various electronic systems, for example, a mobile device such as a mobile phone, a smartphone, a personal digital assistant (PDA), a tablet computer or a laptop computer, another computing device such as a PC, a netbook computer, or an electronic product such as a TV, a smart TV or a security device for a gate control, as non-limiting examples.

Figure 7:
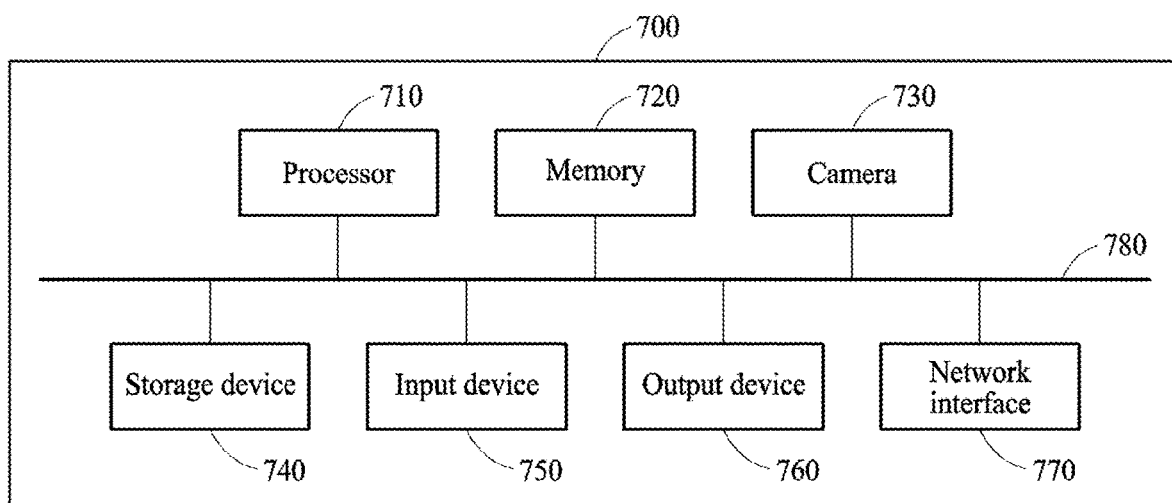
FIG. 7 is a block diagram illustrating an example of a computing apparatus that performs authenticating or identifying with an adaptively updated enrollment DB.

FIG. 7 is a block diagram illustrating an example of a computing apparatus that performs authenticating or identifying with an adaptively updated enrollment DB.

A computing apparatus 700 performs a face authentication or identification process by obtaining an input image in which a face of a user is represented, for example, and performs a face authentication or identification process by comparing an example face feature vector extracted from the input image to enrolled feature vectors as adaptively enrolled as discussed herein. The computing apparatus 700 may correspond to the computing apparatus 600 of FIG. 6, as well as the computing apparatuses of FIGS. 8A-8E and computing apparatuses otherwise discussed herein, as non-limiting examples. As noted above, though face authentication or identification and adaptive updating of corresponding enrolled feature vectors of an enrollment database (DB) are discussed below as an example, examples alternatively or in addition may include other types of authentications or identifications based on alternative or additional input information, e.g., fingerprint, eye or iris, or blood vessel based authentication or identification, as well as corresponding updating of such corresponding feature vectors in such alternative or additional enrollment database examples.

The computing apparatus 700 includes a processor 710, a memory 720, a camera 730, a storage device 740, an input device 750, an output device 760, and a network interface 770. As noted above, in an example, the processor 710, the memory 720, and the camera 730 may correspond to the processor 620, memory 630, and image sensor 610 of the computing apparatus 600 of FIG. 6. The processor 710, the memory 720, the camera 730, the storage device 740, the input device 750, the output device 760, and the network interface 770 communicate with one another through a communication bus 780. For example, the communication bus 780 may correspond to bus 640 of FIG. 6.

The processor 710 may implement functions and instructions in the computing apparatus 700 as described herein. For example, the processor 710 may execute instructions stored in the memory 720 and/or the storage device 740, as discussed above with respect to FIG. 6. Accordingly, the processor 710 may be configured to perform one or more or all processes, stages, or operations described with reference to FIGS. 1-6 and 8A-8E. In addition, the processor 710 is configured to control other functions of the computing apparatus 700. For example, the computing apparatus 700 may be mobile device, such as a mobile phone, tablet, or personal computer, and thus the processor 710 is further configured to control or implement other typical functions of the computing apparatus 700. In an example, the processor 710 may be configured to implement a lock-out operation to only permit a user to access or implement such other typical functions upon a successful authentication or identification of the user's captured face image. As noted, the computing apparatus 700 may include, for example, various electronic systems, for example, a mobile device such as a mobile phone, a smartphone, a personal digital assistant (PDA), a tablet computer or a laptop computer, a computing device such as a PC, a netbook computer, or an electronic product such as a TV, a smart TV or a security device for a gate control, as non-limiting examples.

The memory 720 is a non-transitory computer readable media or device that store information to be used for the face authentication or identification. The memory 720 includes a computer-readable storage medium or a computer-readable storage device. In addition, memory 720 is further representative of multiple such types of memory. The memory 720 may store the example instructions to be implemented or executed by the processor 710 and stores related information generated or relied upon during software an application execution by the computing apparatus 700.

The camera 730 captures a still image, a video, or both. The processor 710 may control the camera 730 to capture an image, e.g., including a face region, a fingerprint image, an eye or iris image, and/or a blood vessel image, as only example, of a user attempting at the corresponding authentication or identification, or may control the camera 730 to autonomously capture images and automatically authenticate or identify a user, for example, without user initiation. In addition, as noted above, the camera 730 may also be controlled by the processor 710 during other functions of the computing apparatus 700, such as when operated as a personal camera.

The storage device 740 includes a non-transitory computer-readable storage medium or a computer-readable storage device. The storage device 740 stores one or more enrollment database (DBs) including information, for example, respective enrolled feature vectors, e.g., registered in an enrollment process. In one example, the storage device 740 stores a greater amount of information than the memory 720, and stores the information for a long period of time. For example, the storage device 740 may include, for example, a magnetic hard disk, an optical disc, a flash memory, a floppy disk, and nonvolatile memories in other forms that are well-known in the technical field to which the present disclosure pertains. The enrollment DBs as discussed herein may be stored in either, both, or respectively partially in either, of the memory 720 and storage device 740.

The input device 750 receives the input from the user through a tactile, video, audio, or touch input. For example, the input device 750 may include a keyboard, a mouse, a touch screen, a microphone, and other devices configured to detect an input from a user and transfer the detected input to the computing apparatus 700.

The output device 760 provides the user with an output of the computing apparatus 700 through a visual, auditory, or tactile channel. For example, the output device 760 includes a display, a touch screen, a speaker, a vibration generator, and other devices configured to provide an output to the user, such as indicating a result of the authentication or identification operation or providing addition visual and/or audible services or information indicative of the success of the authentication or identification operation.

The network interface 770 communicates with an external device through a wired or wireless network. The network interface 770 includes, for example, an Ethernet card, an optical transceiver, a radio frequency transceiver, or another network interface card configured to transmit or receive information. The network interface 770 communicates with an external device using Bluetooth, WiFi, or a third generation (3G), fourth generation (4G), or fifth generation (5G) communication method. The network interface 770 may further include a near field transceiver or the like. For example, through control of the processor 710 upon authentication of a user, the near field transceiver may transmit a payment authorization to an external terminal, such as with an appropriate mobile payment instruction transmitted by the near field transceiver. In addition, the processor 710 may control the network interface 770 to routinely check for updates for the feature vector extractors and other models or neural network(s), for example, used in or configured to implement the feature vector extraction and other operations described herein, and request, receive, and store parameters or coefficients of the same in the memory 720. Similarly, the processor 710 may control the network interface 770 to provide the updated enrollment DB to other computing apparatus for which the user is also authenticated, for example, and to request update of the same as generated by other computing apparatuses that implement any, any combination, or all operations discussed herein.

The respective computing apparatuses, memories, computing apparatuses 820, image sensor or camera 830, display 825, storage 860, fingerprint sensor 817, wearable device 890, computing apparatus 600, processor 620, memory 630, image sensor 610, computing apparatus 700, processor 710, memory 720, camera 730, bus 780, storage device 740, input device 750, output device 760, and network interface 770, as only examples, and other apparatuses, units, hardware modules, devices, and other components described herein with respect to FIGS. 1-8E and that perform operations described in this application are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The processes and methods demonstrated in FIGS. 1-8E that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method with an adaptively updated enrollment database (DB), the method comprising:
   extracting an input feature vector from an input image;
   determining whether the input feature vector is included in a changeable enrollment range, by: calculating distances between the input feature vector and a plural enrolled feature vectors; determining whether the largest distance among the calculated distances is smaller than the maximum threshold distance; and determining whether the smallest distance among the calculated distances is larger than the minimum threshold distance;
   determining whether to enroll the input feature vector in the enrollment DB in response to the input feature vector being determined as being included in the changeable enrollment range; and
   in response to a result of the determining of whether to enroll the input feature vector being to enroll the input feature vector, selectively enrolling the input feature vector in the enrollment DB.

2. The method of claim 1, wherein the determining of whether to enroll the input feature vector in the enrollment DB comprises:
   in response to the largest distance being larger than the maximum threshold distance, excluding an enrollment of the input feature vector by determining the input feature vector as an outlier.

3. The method of claim 1, further comprising adjusting the changeable enrollment range by adjusting at least one of the maximum threshold distance or the minimum threshold distance.

* * * * *